United States Patent [19]

McCarthy et al.

[11] 4,126,704
[45] Nov. 21, 1978

[54] METHOD FOR FORMING A SHAPED COMESTIBLE

[75] Inventors: John P. McCarthy, College Point; John Moyer, Garden City, both of N.Y.; Leonard Fischer, Elkridge, Md.

[73] Assignee: DCA Food Industries Inc., New York, N.Y.

[21] Appl. No.: 852,062

[22] Filed: Nov. 16, 1977

Related U.S. Application Data

[60] Continuation of Ser. No. 641,072, Dec. 15, 1975, abandoned, which is a division of Ser. No. 491,468, Jul. 23, 1974, Pat. No. 3,940,217.

[51] Int. Cl.² ............................................. A22C 7/00
[52] U.S. Cl. ...................................... 426/304; 17/32; 426/512; 426/513; 426/575; 426/802; 426/811
[58] Field of Search ............... 426/282, 297, 302, 573, 426/574, 575, 577, 512, 513, 802, 389, 516, 811, 292, 304; 17/32; 425/94, 98, 104; 264/45.4

[56] References Cited

U.S. PATENT DOCUMENTS

| 2,120,640 | 6/1938 | Craemer | 426/389 X |
|---|---|---|---|
| 2,733,152 | 1/1956 | Edgar | 426/811 X |
| 2,878,127 | 3/1959 | Forkner | 426/577 X |
| 2,942,987 | 6/1960 | Beerend | 426/389 X |
| 2,981,973 | 5/1961 | Elmore | 426/513 X |
| 3,084,051 | 4/1963 | Bromstead et al. | 426/811 X |
| 3,141,779 | 7/1964 | Podebradsky et al. | 426/811 X |
| 3,476,841 | 11/1969 | Biehert | 264/45.4 |
| 3,650,765 | 3/1972 | Smadar et al. | 426/516 X |
| 3,650,766 | 3/1972 | Smadar | 426/292 X |
| 3,724,026 | 4/1973 | Gernadt | 17/32 X |
| 3,814,560 | 6/1974 | Smadar et al. | 425/104 |

Primary Examiner—Kenneth M. Schor
Attorney, Agent, or Firm—Philip H. Gottfried

[57] ABSTRACT

A machine is provided for practicing the method of forming a comestible in one of a variety of shapes from a foodstuff slurry. The slurry includes a gel-forming material and is supplied in predetermined amounts to a cavity which has been washed with a combination release and gellation agent. Apparatus is provided for contacting the exposed surface of the slurry in the cavity with a gellation agent to gel the gel-forming material at the outer surface of the formed product. Further apparatus is provided for transporting the cavity filled with the foodstuff to a product removal station. Punch apparatus is aligned with the cavity at the product removal station and is actuated to extend into and extrude the product from the cavity onto a conveyor belt to be removed for further processing. Control means are provided for ensuring operation of the punch apparatus only when the cavity is aligned therewith and, further, the control apparatus ensures that the cavity is not transported back to the filling station until the punch has been fully retracted from the cavity.

5 Claims, 11 Drawing Figures

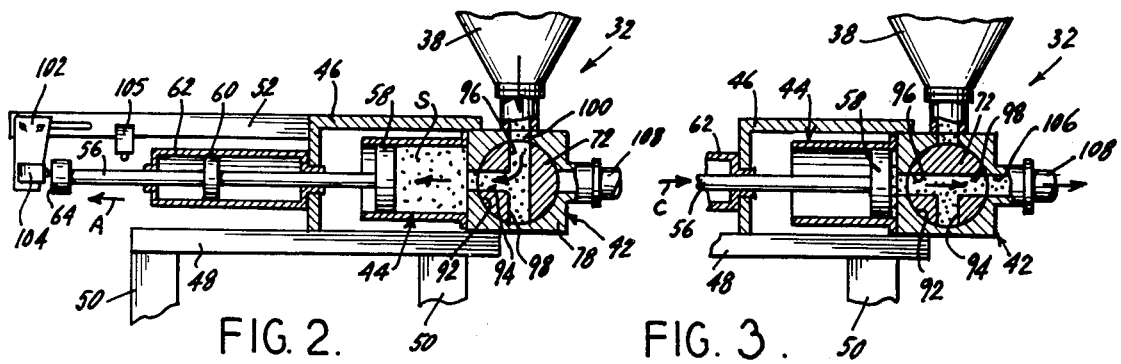
FIG. 2.   FIG. 3.
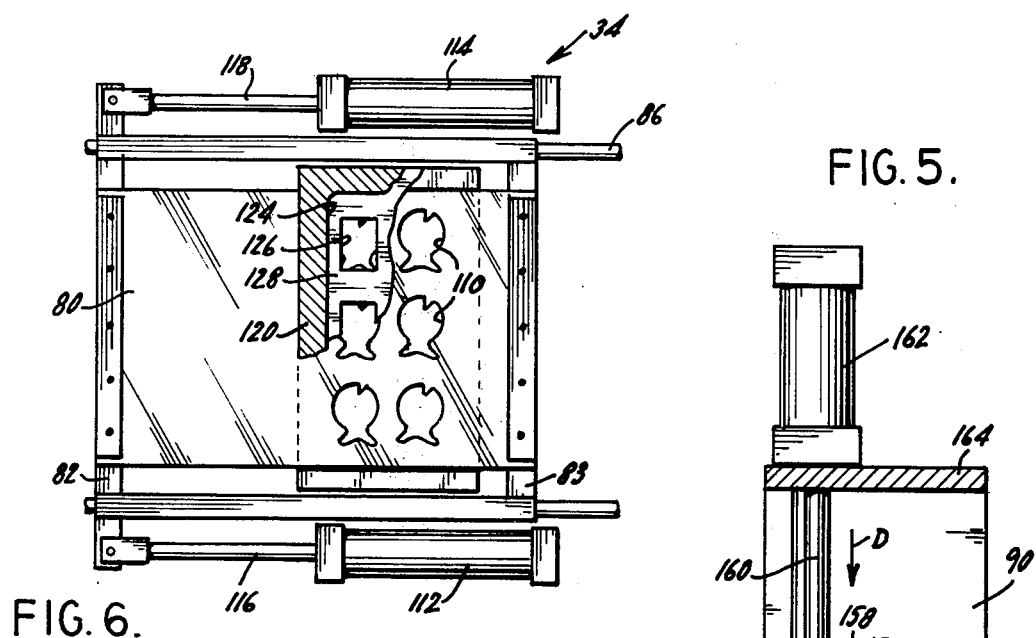
FIG. 5.
FIG. 6.
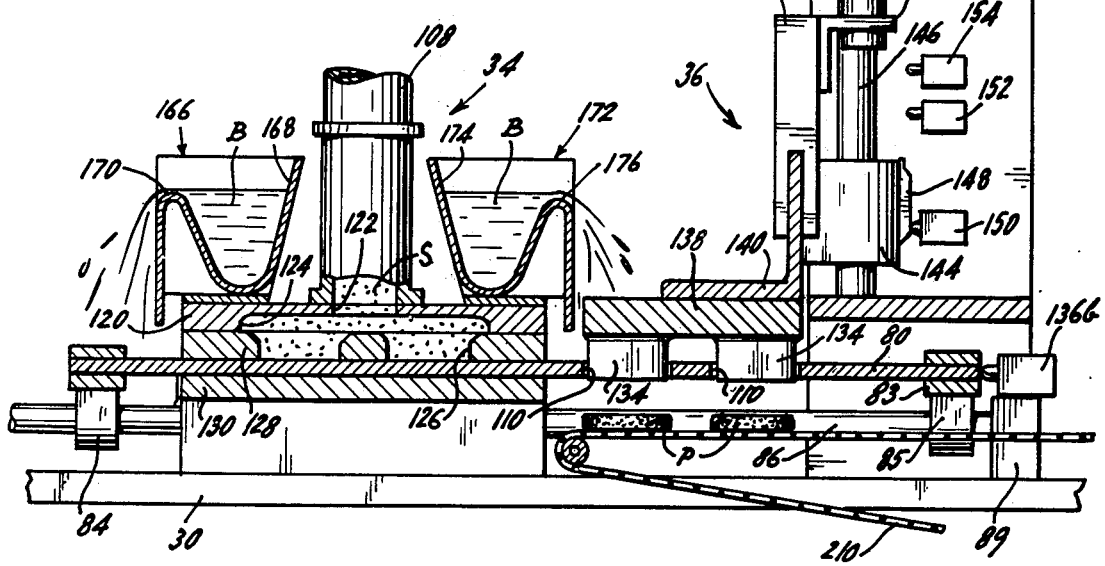

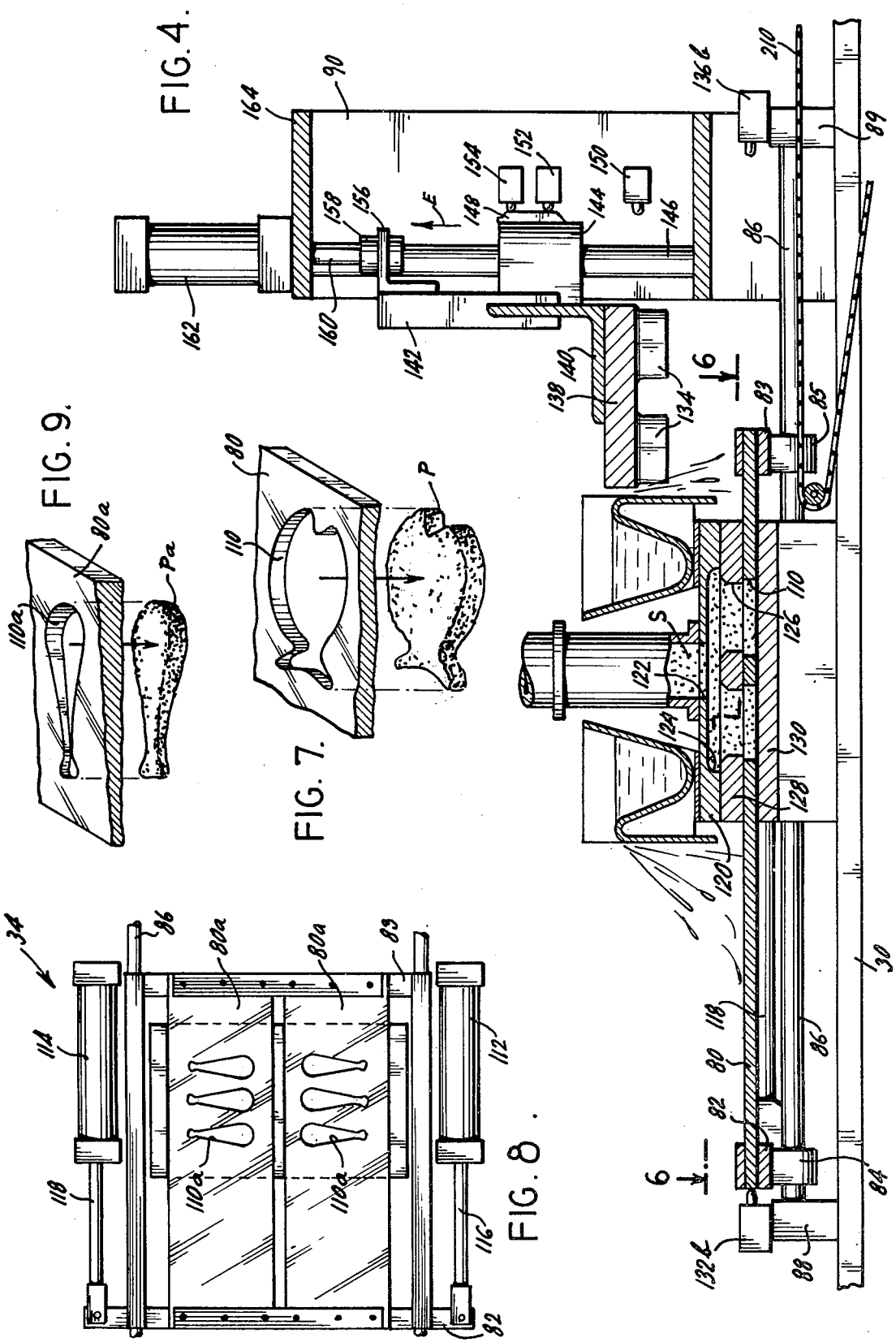

METHOD FOR FORMING A SHAPED COMESTIBLE

This is a continuation, of application Ser. No. 641,072 filed Dec. 15, 1975 now abandoned which was, in turn, a division of application Ser. No. 491,468 filed July 23, 1974, now U.S. Pat. No. 3,940,217 which issued Feb. 24, 1976.

The present invention relates generally to a method for forming a foodstuff from finely divided food particles, and in particular to an apparatus and method for shaping a comestible from a foodstuff containing a gel-forming material and gelling the outer surface thereof by washing the formed comestible with a gellation agent.

Various machines are available for the formation of a comestible in a desired shape from a foodstuff which has been finely divided or comminuted such as by shredding, chopping mashing, grinding or the like. In certain instances, the divided foodstuff may be re-formed into a desired shape by extruding the foodstuff from a nozzle of a specific shape or by forcing the foodstuff through a die. Alternately, the divided foodstuff may be reformed into a desired shape by extruding into a cavity, thereby assuming the shape or configuration of the cavity, and then being removed from the cavity as a formed comestible.

The needs for initially dividing a foodstuff or using an already-divided foodstuff and reforming said foodstuff by forcing through an opening or the like are many. For example, a certain product having desirable nutritional qualities may be too fibrous for easy consumption by children or those with dental problems.

Certain "natural" foodstuffs may be too fibrous for enjoyable consumption by someone possessed of normal dention. For example, certain grades of beef are possessed of high quality protein but contain fibers which render them difficult to masticate. If such beef were prepared in the normal manner, such as by frying or broiling whole, it would be virtually inedible.

However, if the fibers of such beef were broken down by forcing the beef through a small opening and the resultant foodstuff were reformed into the well-known hamburger pattie, the cooked, re-formed foodstuff could be easily consumed by virtually anyone.

In addition, it may be desirable to utilize what would normally be the waste products of processing of foods such as fish, shrimp, chicken or the like. For example, in filleting a whole fish, various scrap pieces are normally discarded which contain much high quality protein. In a like manner, when boned chicken is prepared, numerous scraps of chicken are normally discarded which only find utilization as food not usually destined for human consumption.

Many small shrimp are caught with larger, more desirable shrimp. The small shrimp are usually too small to be considered of commercial value and are returned to the sea often to die and be wasted. The small shrimp in fact possess virtually all of the flavor and food value, if not the size of the larger shrimp.

With each of the foodstuffs noted, the divided foodstuff, whether fish, chicken or shrimp can be mixed with other products to form a slurry usable for re-forming. Re-forming can be accomplished by including a product in the slurry which forms a gel upon exposure to a gel-forming solution in the form of a bath or a wash.

If a nutritious, desirable food product can be formed in an appealing shape from these normally-wasted by-products, great cost savings can be effected while eliminating waste.

In addition, if a method of forming such food products can be repeated consistently, portion control is greatly simplified and accomplished by simply counting the number of identical formed shapes produced. Such portion management is usable in both cost and nutrition control.

The process for the manufacture of food products by extrusion of a slurry of food material including a gel-forming matrix together with formation of a gel-like skin around the extruded product is contained in U.S. Pat. No. 3,650,765 and U.S. Pat. No. 3,650,766, both of which issued Mar. 21, 1972 and both of which are assigned to the assignee of the present application.

Machines are disclosed in the prior art for use in the formation of a product, such as a hamburger pattie or the like, by forcing ground meat into a shape forming cavity in direct communication with a large supply of such ground meat. The cavity containing the ground meat is removed from communication with the supply and the meat is removed from the cavity as a formed pattie.

In order to prevent waste in such a forming machine, there must be a relatively tight fit between the plate carrying the cavity and the source of the meat when the meat is forced into the cavity. This same tight fit renders it difficult to remove the plate from communication with the supply of meat. Were it not for the natural and added fats which are included in ground meat, such a device would be very difficult to operate without external lubrication which could easily contaminate the foodstuff, obviously an undesirable result.

Many foodstuff molding or forming devices presently available are not equipped for forming a plurality of foodstuffs simultaneously. Further, most foodstuff forming devices are not equipped for forming a foodstuff in other than a shape which is generally uniform in cross-section.

In addition, machines which exist in the market for producing an extruded foodstuff containing a gel-forming matrix which forms a gel-like skin upon exposure to a gellation agent, are not capable of producing involved shapes including recurved peripheries or shapes which vary sharply in cross-section in adjacent areas.

It is an object of the present invention to provide a machine for the manufacture of one or a plurality of formed food products, from a foodstuff containing a gel-forming matrix where the exterior of the foodstuff is washed with a gellation agent, thereby forming a gelled skin thereabout.

It is a further object of the present invention to provide a method for the formation of a shaped food product which includes use of a foodstuff slurry which contains a gel-forming material therein, extruding said foodstuff slurry into a shape forming cavity which has been previously wetted with a combination gellation and release agent and wetting the formed foodstuff with a combination gellation and release agent to aid in the formation of the foodstuff and the release thereof from the cavity.

In accordance with a specific embodiment of the present invention, a machine is provided for the formation of a shaped comestible from a foodstuff slurry containing a gel-forming material. The machine comprises a forming station where the shaped comestible is formed by extruding material into the shape forming cavity and a removing station wherein the shaped comestible is removed from the cavity. A plate has at least one shape forming cavity therein of a predetermined outer configuration for use in forming the foodstuff into a shape having the same outer configuration as the cavity. Means mount the plate for movement of the cavity between the forming station and the removing station. Foodstuff delivery means are located in operative relation to the forming station for periodically supplying the cavity with a predetermined amount of the foodstuff. Means are provided in operative relation to the forming station for use in coating the unfilled cavity and the surface of the foodstuff delivered to the cavity with a gellation agent for gelling the gel-forming material on the surface of the foodstuff. Means are provided for use in preventing the slurry not in the cavity from leaving the forming station. A punch is provided in operative relation to the removing station of substantially the same outer configuration as the cavity. Means mount the punch for movement between a normal position where the punch does not intersect the cavity when it is located at the removing station and an extended position where the punch does intersect and extend into the cavity when the cavity is located at the removing station. Means are provided for operating the foodstuff delivery means to supply the predetermined amount of foodstuff to the cavity and fill the cavity therewith. Means are provided for transporting the filled cavity from the forming station to the removing station and into alignment with the punch. Control means are supplied including means which are constructed and arranged to operate the punch from the normal to the extended position for use in urging the foodstuff from the cavity only upon the cavity being aligned with the punch. The control means further includes means constructed and arranged for operating the transporting means to remove the cavity from the removing station toward the forming station only upon the punch returning from the extended to the normal position.

The above brief description as well as further objects, features, and advantages of the present invention will be more fully understood by reference to the following detailed description of the presently preferred but nonetheless illustrative embodiments in accordance with the present invention, when taken in conjunction with the accompanying drawing, wherein:

FIG. 2 is a fragmentary sectional elevational view of part of the foodstuff supply and delivery means of the present invention showing a supply hopper in communication with a foodstuff advance piston;

FIG. 3 is a fragmentary sectional elevational view similar to FIG. 2 with the foodstuff advance piston shown in communication with a conduit connected to a cavity of the present invention;

FIG. 4 is a fragmentary sectional elevational view, with parts broken away, of the forming and ejection apparatus of the present invention, on an enlarged scale, with a shape-forming plate being shown in position at a forming station and receiving foodstuff in mold cavities thereof;

FIG. 5 is a fragmentary sectional elevational view similar to FIG. 4 with a plate being shown in position for ejection of a shaped product therefrom and an ejecting means being shown in an extended position intersecting and partially extending through cavities of the forming plate;

FIG. 6 is a fragmentary top plan view of the forming plate and advancing apparatus of the present invention taken substantially along the lines 6—6 of FIG. 4 and looking in the direction of the arrows;

FIG. 7 is a fragmentary perspective view, on an enlarged scale, of a forming plate of the present invention showing a formed foodstuff having been ejected therefrom;

FIG. 8 is a fragmentary top plan view, similar to FIG. 6., of an alternate embodiment of a wedge-shaped forming plate of the present invention;

FIG. 9 is a fragmentary perspective view, similar to FIG. 7, of the wedge-shaped forming plate of FIG. 8 showing a wedge-shaped extruded product having been ejected therefrom;

Figure 1:
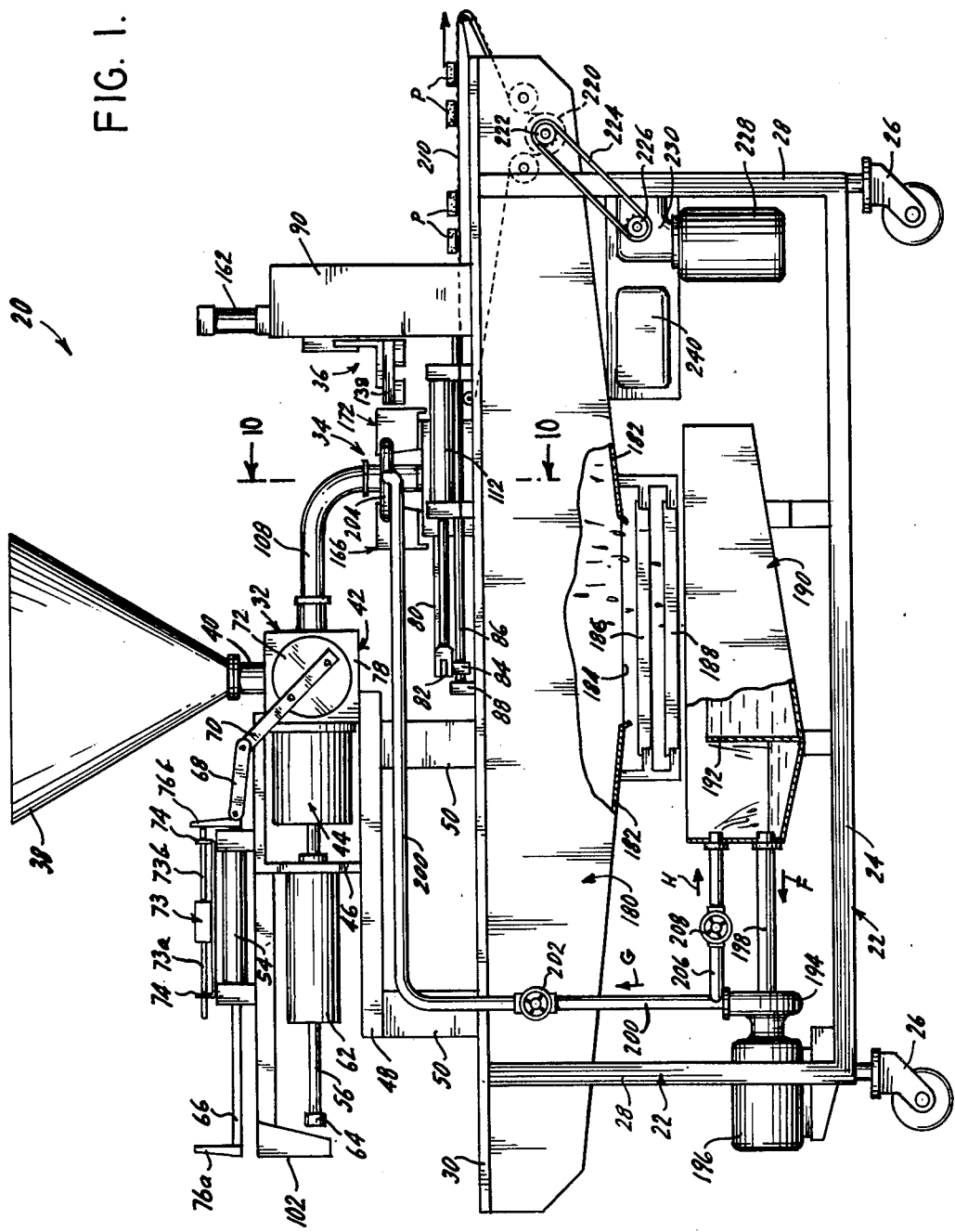
FIG. 1 is a front elevational view, with parts broken away and shown in section of an illustrative form of the present invention.

Referring now specifically to the drawing, and first to FIG. 1, in accordance with an illustrative embodiment demonstrating objects and features of the present invention, there is provided a forming machine, generally designated by the reference numeral 20, which includes a frame 22 having four lower, generally horizontal support members 24 joined in a rectangle and which may be supported on casters 26. The machine 20 includes four upstanding frame members 28 fixed to the horizontal support members 24 which, in turn, support a generally plane horizontal table surface 30 at their upper limits.

The forming machine 20 generally includes a foodstuff delivery station generally designated by the reference numeral 32 operatively connected to a forming station, generally designated by the reference number 34, which is, in turn, in operative relation to a removing station generally designated by reference numeral 36.

The foodstuff delivery station 32 includes a hopper 38 for receipt of an extrudable, formable foodstuff slurry and may include an auger for impelling the foodstuff toward a supply conduit 40 into a foodstuff supply drum valve 42, the operation of which will be described hereinafter.

Affixed to the left side of the drum valve 42 is a foodstuff supply cylinder 44 which is mounted on the drum valve 42. The drum valve 42 and the foodstuff supply cylinder 44 are both supported in part on a frame member 46 which, in turn, rests upon a generally horizontal support 48. The support 48 is, in turn, supported on the table 30 by upstanding support legs 50.

Also fixed to the frame 46, is an outwardly extending extension arm 52 which is shown in greater detail and the purpose of which will be described in conjunction with FIG. 2.

The extension arm 52 supports a double-acting drum valve actuating cylinder 54 which is connected to the drum valve 72 to actuate the same in a manner to be described in detail hereinafter.

The leftmost, downwardly extending leg of the frame 46 includes an opening therein which carries a bearing through which a piston rod 56 protrudes. The right end of the piston rod is fixed to a foodstuff advance piston 58 (see FIGS. 2 and 3) and carries an operating piston 60 medially thereof. The operating piston 60 is enclosed within actuating cylinder 62. The piston rod 56 includes a limit switch actuator 64 at its leftmost end, for a purpose to be described hereinafter.

The right end of a piston rod 66 of the drum valve actuating cylinder 54 is pivotably fixed to the left end of a connecting arm 68 such as by being pinned thereto. The right end of the connecting arm 68 is, in turn, pivotably fixed to the left end of a drum valve actuating arm 70 such as by being pinned thereto. The drum valve actuating arm 70 is, in turn, fixed to a drum valve body 72 of the drum valve 42 for actuation thereof in a manner to be described.

A spool valve 73 includes operators 73a and 73b extending outwardly from the left and right sides thereof and is mounted atop drum valve actuating cylinder 54 by a bracket 74. The bracket 74 includes openings through the upturned ends thereof to permit reciprocation of the operators 73a, 73b therethrough. Piston rod 66 includes left and right spool valve actuators 76a, 76b affixed to the left end right ends thereof which are generally upstanding and extend sufficiently upwardly to contact left and right spool valve operators 73a, 73b, respectively, upon actuation of drum valve actuating cylinder 54 in a manner to be described in more detail hereinafter.

As may be seen by reference to FIG. 1, when the drum valve body 72 is in the counterclockwise position, piston rod 66 is extended to the left and drum valve operator 73b has been contacted by drum valve actuator 76b and has been moved to the left for use in operation of the forming machine 20 in a manner to be described hereinafter.

A forming plate 80, which will be more fully described hereinafter with reference to FIGS. 4, 5 and 6, is removably fixed at its left and right ends to generally horizontal, transversely extending, support bars 82, 83. Support bars 82, 83 are supported, in turn, on guide bearings 84, 85 on both sides of the machine 20 which are slidably carried by support rods 86. The support rods 86 are, in turn, supported at their leftmost ends by support blocks 88, 89 affixed to the table 30 at the left and right ends thereof (see FIG. 4). The right support blocks are located within a housing 90 for part of the control apparatus of the present invention.

As may be best seen by reference to FIGS. 2 and 3, the drum valve body 72 is generally cylindrical and is housed within a generally cylindrical opening 92 within drum valve housing 78. The drum valve body 72 includes a "T"-shaped passageway therethrough with a center leg 94 in communication with left and right arms 96, 98 (see FIGS. 2 and 3).

When the drum valve actuating arm 70 is in the clockwise rotated position by virtue of the double acting cylinder 54 having been moved to the right in a manner to be described hereinafter, the drum valve body 72 is rotated so that the left arm 96 of the passageway therein is in communication with the interior of the hopper 38 through a passageway 100 which extends through the valve housing 78 and into the hopper. In this position, the center leg 94 of the passageway in the drum valve body 72 is in communication with the interior of the foodstuff supply cylinder 44. If the piston rod 56 of the double acting cylinder 62 is moved to the left as shown by directional arrow A in FIG. 2, the foodstuff advance piston 58 will likewise move to the left by virtue of being connected thereto. Movement of the foodstuff advancing piston to the left draws foodstuff slurry S from the hopper 38 through the passageway 100, through the arm 96 of the passageway within the drum valve body 72, through the leg 94 and into the interior of the cylinder 44.

The piston rod 56 will travel to the left as shown by the directional arrow A until the actuator 64 abuts a "strongback" stop 102 which is adjustably fixed to the outer end of the arm 52 which also carries a limit switch 104 which is actuated by the actuator 64 for a purpose to be described hereinafter.

As may be noted by reference to FIG. 2, stop 102 and limit switch 104 carried thereby are adjustably fixed to the arm 52 for use in varying the length of the stroke of the product actuating cylinder 62 for supplying varying amounts of slurry S for a purpose and in a manner to be described more fully hereinafter. A limit switch 105 is fixed to the arm 52 and is actuated by actuator 64, when the piston rod 56 is at the right-most limit of its stroke, for a purpose to be described.

Upon actuation of the actuating cylinder 54 to move the piston rod 66 to the left, the actuating arm 70 is moved counterclockwise to the position shown in FIG. 1 and the drum valve body 72 is rotated within the opening 92 in the valve housing 78 so that the central leg 94 of the passageway therein is closed (see FIG. 3). In that position, the left arm 96 of the passageway is in communication with the interior of the foodstuff supply cylinder 44 and the right arm 98 of the passageway is in communication, through a passageway 106, with a conduit 108 which is, in turn, in communication with the forming station 34 in a manner to be described.

With the drum valve body 72 in the position shown in FIGS. 1 and 3, if the operating piston 60 and the piston rod 56 to which it is affixed are moved to the right as shown by the directional arrow C in FIG. 3, the foodstuff supply piston 58 urges the foodstuff slurry S through the drum valve passageway arms 96, 98 through the passageway 106 and into the conduit 108 toward the forming station 34.

The forming plate 80, in one of the preferred embodiments of the present invention, is of substantially uniform longitudinal and transverse cross-section (see FIGS. 4, 5 and 7) and includes one or more forming cavities 110 therein near the right end thereof (see FIG. 6). The forming cavities 110 may be of any predetermined shape or configuration and the cavities 110 shown in the preferred embodiment illustrated in FIGS. 4–7 shows an outer configuration which generally approximates the shape of a small fish.

The forming plate 80 is moved by sliding along the support rods 86 so that the forming cavities 110 move between the forming station 34 and the removing station 36 by virtue of actuation of double acting cylinders 112, 114 fixed to the table 30 at opposite transverse sides of the forming plate 80. Piston rods 116, 118 are operated by cylinders 112, 114. The exterior ends of rods 116, 118 are connected to opposite transverse sides of support bar 82 and are shown in FIG. 6 in an extended position with the forming cavities 110 of the forming plate 80 at the forming station 34 as also shown in FIG. 4.

As may be best seen in FIG. 4, conduit 108 is in communication with a foodstuff distribution plate 120 through an opening 122 in the top thereof. The foodstuff distribution plate 120 includes a foodstuff distribution manifold cavity 124 therein which is of a size to be generally aligned with forming cavities 110 in the forming plate 80 when the forming plate is in communication therewith at the forming station 34.

The manifold cavity 124 in the plate 120 communicates with the forming cavities 110 through a plurality of generally funnel-shaped cavity supply openings 126 in a foodstuff channeling plate 128. The openings 126 in the plate 128 are equal in number to the number of forming cavities 110 and are aligned at their lower ends with the forming cavities 110 when the forming plate 80 is at its leftmost position totally within the forming station 34 (see FIG. 4).

The foodstuff channeling plate 128 is fixed to the underside of the foodstuff distribution plate 120 with virtually no clearance therebetween. The foodstuff channeling plate 128 is mounted above the forming plate 80 with sufficient clearance to permit transportation thereof so that the cavities 110 reciprocate between the forming station 34 and the removing station 36 in a manner to be described.

The forming plate 80 is in sliding contact with and maintains sufficient clearance above a substantially solid backing plate 130 to permit relatively unhampered movement of the cavities 110 between the forming station 34 and the removing station 36.

As noted above and as may be seen by reference to FIGS. 4, 5 and 6, the manifold cavity 124 is sufficiently large to overlie all of the forming cavity supply openings 126 for aid in uniform distribution of foodstuff slurry S thereto. In addition, the forming cavity supply openings 126 need not be precisely the same size or configuration as the cavities 110. In fact, the supply openings 126 may be smaller than the forming cavities 110, thereby permitting the use of a single configuration for the cavity supply openings 126 with various different configurations of the forming cavities 110 and still maintain the desired distribution of the foodstuff slurry S thereto.

As noted above, when the plate actuating cylinders 112, 114 are in the position shown in FIG. 6 with the piston rods 116, 118 in an extended position, the forming plate 80 is located with the forming cavities 110 within the forming station 34 aligned with the respective forming cavity supply openings 126 and in communication with a predetermined supply of foodstuff slurry S. In this position, the leftmost edge of the forming plate 80 bears against and actuates both of a pair of limit switches 132a, 132b fixed atop the support blocks 88 for the support rod 86 (see FIGS. 4 and 11).

When the plate actuating cylinders 112, 114 have been actuated (as described hereinafter) to retract the rods 116, 118 thereby transporting the forming plate 80 with the forming cavities 110 to the removal station 36 (see FIG. 5) and into alignment with punches 134, the rightmost end of the forming plate 80 abuts and actuates both of a pair of limit switches 136a, 136b (see FIG. 11) mounted atop the support blocks 89, which support the rightmost end of the support rod 86 as seen most clearly in FIG. 5.

The punches 134 are of the same outer configuration as the cavities 110, are aligned with and equal in number thereto and are permanently affixed to or are part of a punch base plate 138. The punches 134 and the base plate 138 may be fashioned of any convenient material such as metal or a plastic such as Delrin or the like. In an alternate embodiment, the punches 134 may be smaller than or of a different configuration than the cavities 110, though in the preferred embodiment they are substantially the same outer configuration as the configuration of the interior of the forming cavities.

The punch base plate 138 is affixed to the underside of a punch bracket 140 which is, in turn, fixed to a support plate 142. The support plate 142 includes two guide members 144 each of which is slidably mounted on a guide rod 146 for guiding the movement of the punches 134 between the extended position wherein they intersect and extend through the forming cavities 110 when the cavities are at the removing station as shown in FIG. 5, and a normal position wherein the punches 134 do not intersect the cavities 110 as shown in FIG. 4.

The guide member 144 shown in FIGS. 4 and 5 includes an actuating cam 148 which bears against and actuates a limit switch 150, fixed to the housing 90, when the punch bracket 140 and associated mechanism is in the extended position illustrated in FIG. 5 for a purpose to be described hereinafter.

When the punch bracket 140 and associated mechanism including the guide member 144 is in the normal position as illustrated in FIG. 4, the actuating cam 148 bears against and actuates limit switches 152 and 154, fixed to the housing 90, for a purpose to be described hereinafter.

As punch bracket 140 and associated mechanism begins to move from the extended position shown in FIG. 5 to the normal position shown in FIG. 4, the actuating cam 148 initially contacts and actuates the limit switch 152. Shortly thereafter, as the punch bracket 140 and associated mechanism continues upwardly, the actuating cam contacts and actuates limit switch 154 while maintaining contact and actuation of the limit switch 152 due to the designed length of the actuating cam 148 and the location of the limit switches 152, 154.

Movement of the punches 134 as attached to the associated support mechanism including support plate 142, punch bracket 140 and base plate 138, is accomplished by connection of the support plate 142, by angle support 156, to mounting member 158. Mounting member 158 is, in turn, affixed to the end of piston rod 160 actuated by a double-acting punch actuating cylinder 162 mounted atop the upper wall 164 of the housing 90. The piston rod 160 protrudes through an opening in the wall 164 (not shown).

Figure 10:
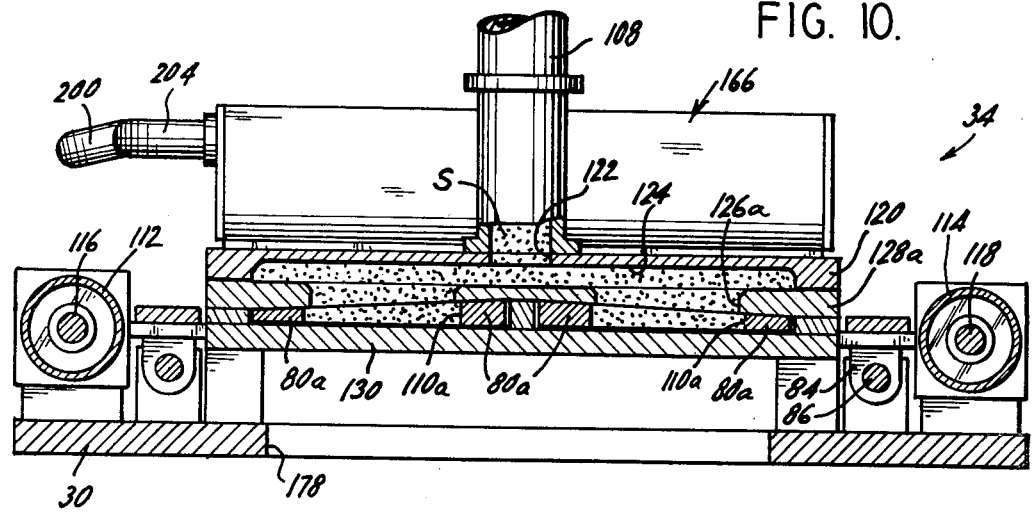
FIG. 10 is a fragmentary sectional right side elevational view, with parts broken away, of the plate of FIGS. 8 and 9 taken substantially along the line 10—10 of FIG. 1 and looking in the direction of the arrows; and, FIG. 11 is a schematic representation of the control system and associated apparatus of the present invention.

As may best be seen by reference to FIGS. 1, 4 or 5, a trough or weir 166 is located atop the foodstuff distribution plate 120 and is mounted at the lefthand edge thereof on the side of the conduit 108 opposite the removing station 36. The weir 166 extends across the entire top of the plate 120 and is arranged transversely to the direction of movement of the forming plate 80 or an alternate embodiment 80a thereof, as shown in FIG. 10, for a purpose to be described hereinafter.

The interior of the weir 166 includes a transversely extending interior wall 168 which is generally U-shaped in cross-section with a longer leg of the "U" located closest to the conduit 108 (to the right in FIGS. 4 and 5). The wall 168 continues downwardly from the right leg to form a bottom wall and angles upwardly and outwardly to the left as seen in FIGS. 4 and 5. At a location adjacent the leftmost edge of the weir 166, the wall 168 re-curves downwardly and extends straight down toward the plate 80. At the location where the wall 168 re-curves, it forms a spillover wall 170 which is lower than the top surface of the right edge of the wall closest to the conduit 108.

The weir 166 is designed so that the part of wall 168 at the leftmost edge of the weir projects downwardly beyond the left edge of the plates 120, 128 and terminates at a point above the forming plate 80 for a purpose to be described hereinafter.

A substantially similar though reversed trough or weir 172 is affixed to the right hand edge of the top of the plate 120 and extends transversely thereacross. The weir 172, in a manner similar to the weir 166, includes an interior wall 174 which is configured to also have a re-curved spillover wall 176 which extends transversely thereacross. In a similar manner to the wall 168, the wall 174 extends to the right of and lower than the right edge of the plate 120 for a purpose to be described more fully hereinafter.

If it is desired to produce a product by the apparatus and method of the present invention which is of uniform thickness in transverse dimension but varies in thickness in the longitudinal direction, a forming plate 80(a) is utilized which is uniform in thickness in the longitudinal direction but varies in thickness in the transverse direction (see FIGS. 8 and 9).

Such a forming plate 80(a) may be made in a single section or, as shown in FIGS. 8 and 10, may be made in two sections each of which are affixed to support bars 82, 83 at their left and right sides and which are arranged with the thicker part thereof toward the center.

As may be best seen by reference to FIG. 10, wherein the same reference numerals denote the same parts and the subscript "a" is used to denote similar parts, a backing plate 130 forms the base for a cavity 110(a) shown as being generally in the form of a chicken leg in FIGS. 8 and 9. The plate 80(a) is shown as attached for movement in a plane into and out of the paper as viewed in FIG. 10 in traveling from the forming station 34 to the removing station 36 and back to the forming station.

In view of the lack of uniform transverse crosssection of the plate 80(a), the foodstuff channeling plate 128 usable with a forming plate 80 of uniform longitudinal and transverse cross-section is not usable with the plate 80(a). Consequently, a foodstuff channeling plate 128 (a) is provided. The underside of plate 128(a) which will be in sliding contact with the upper surface of plate 80(a) which is angled with respect to the upper surface thereof in order to permit longitudinal movement between the forming station 34 and the removing station 36 of the plate 80(a) with a minimum of leakage of the foodstuff slurry S therebetween.

As may be best seen in FIG. 10, the alternate embodiment of the foodstuff channeling plate 128(a) includes openings 126(a) therein which may be different than the openings 126 in the foodstuff channeling plate 128 but which may also be the same openings 126 of a generally rectangular shape as used for the cavities 110.

The same foodstuff distribution plate 120 may be used in this alternate embodiment including the same manifold opening 124 in communication with all of the openings 126(a) in the foodstuff channeling plate 128(a). The manifold cavity 124 communicates through opening 122 therein, through the conduit 108 with the predetermined amount of the supply of foodstuff slurry S.

As may be seen by reference to FIGS. 8 and 10, the forming plate or plates 80(a) assume an attitude which is longitudinally uniform in cross-section with respect to the direction of movement of the plate or plates 80(a) between the forming station 34 and the removing station 36. The forming plate or plates 80(a) vary in cross-section in the direction which is transverse with respect to the movement between the forming and removing stations 34, 36.

The forming cavity 110(a) includes a boundary configuration which is generally in the shape of a chicken leg and is arranged in the plate 80(a) with its longitudinal, thickness varying axis transverse with respect to the direction of movement of the forming plate between the forming station and the removing station. The basal end of the chicken leg configuration is at the right as seen in FIG. 9 and the distal end of the chicken leg configuration is at the left as seen in FIG. 9.

As a result of the wedge-shaped nature of the crossection of the plate or plates 80(a) and the aforementioned alignment of the configuration of the forming cavity 110(a), the product P(a) formed within the forming cavity 110(a) by a procedural combination of steps to be described in detail hereinafter is also generally wedge-shaped, being thicker in cross-section at its basal end to the right in FIG. 9 and tapering to a cross-section which is thinner at its distal end to the left in FIG. 9. The product P(a) is generally uniform in transverse cross-section though tapering slightly toward the ends thereof.

As noted hereinabove, one of the objects of the present invention is to provide a method and apparatus for forming a shaped comestible from a foodstuff slurry containing a gel-forming material and washing an unfilled forming cavity and the surface of foodstuff delivered to the cavity with a gellation agent for gelling the gel-forming material on the surface of the foodstuff.

In accomplishment of that object there are provided weirs 166, 172 which include therein a bath B of a gellation agent which is continuously supplied to both weirs so as to form a continuous curtain and wash the plate 80 or 80(a) and the respective forming cavities 110, 110(a) therein with gellation material. The weirs 166, 172 are continuously supplied with gellation agent by a supply system to be described.

As most clearly seen in FIG. 1, gellation agent washes over the spillover walls 170, 176 of weirs 166, 172 and washes over, for example, forming plate 80, falls through a central opening 178 in the table 30 (see FIG. 10) and is collected in a collection trough 180. The collection trough 180 includes a lower wall 182 which has an opening 184 located generally centrally of the machine 20.

The trough 180 collects the excess gellation agent supplied by the weirs 166, 172 and directs the same through the opening 184, through an upper, removable particle screen 186 and, in turn, through a lower, removable particle screen 188 and into a collection tank 190.

The upper and lower particle screen 186, 188 include openings therein sized to permit the passage therethrough of the gellation agent but also sized to prevent the passage therethrough of most of the particles of the extruded foodstuff slurry S which are not retained within the forming station 34 or which do not form a product P or P(a).

The purpose of having upper and lower screens 186, 188 is that screen 186, removably mounted beneath opening 184, may be removed for cleaning, while screen 188 remains in place and operation of the forming machine 20 need not be interrupted. Once screen 186 has been cleared and replaced in position beneath the opening 184, particle screen 188(which is also removably mounted beneath the opening 184) may be removed and cleaned and, again, the operation of the forming machine 20 need not be interrupted.

The collection tank 190 includes a generally upstanding spillover wall 192 which extends across the width of the tank and forms a dam therein and a collection chamber at the right side thereof. By virtue of the location of the wall 192 relative to the opening 184, most if not all of the gellation agent which is received by the collection tank is initially contained within the rightmost section formed by the wall 192.

Particles of the foodstuff slurry S which have passed through both of the particle screen 186, 188 in succession, fall to the bottom of the right hand section of the collection tank 190 and substantially only gellation agent spills over the top of the wall 192 into the leftmost or supply chamber.

A centrifugal pump 194, driven by connection to a suitable motor 196, includes an intake conduit 198 attached to the intake thereof with the rightmost end of the conduit being in communication with the leftmost, supply chamber in the collection tank 190. The pump 194 draws gellation agent into the conduit 198 in the direction indicated by the directional arrow F in FIG. 1. The gellation agent drawn into the conduit 198 exists from an outlet of the centrifugal pump 194 along a conduit 200 in the direction of the directional arrow G, passing through an adjustable valve 202 in the conduit 200 to a "T" connection with a conduit 204 which equally divides and supplies the gellation agent to the two weirs 166, 172.

The motor 196 which supplies the power for the centrifugal pump 194 is most efficiently operated as a constant speed device. However, the requirements for the amount of gellation agent supplied at the weirs 166, 172 to provide the continuous curtain of gellation agent flowing over the overflow walls 170, 176 thereof may vary with variation in speed of operation of the machine, variation in the number or complexity of shape of the products produced, or various other factors.

Accordingly, valve 202 may be adjusted to restrict the size of the opening therethrough, thereby controlling the amount of gellation agent supplied to the weirs 166, 172. In order to maintain the pump 194 functioning at constant speed and yet control the amount of gellation agent passing to the weirs 166, 172 by use of the adjustable valve 202, a relief conduit 206 intersects the conduit 200 in close proximity to the discharge orifice of the centrifugal pump 194. The relief conduit 206 supplies the excess gellation agent through an adjustable valve 208 in the direction of the directional arrow H back to the supply compartment on the left of the collection tank 190.

The adjustable valve 208 is necessary in order to provide a restriction in the relief conduit 206 sufficient to provide enough pressure to the fluid within the conduit 200 to force it to pass through the adjustable construction formed by the valve 202 and be supplied in the required amount to the weirs 166, 172 through the conduit 204.

As the forming cavities 110 or 110(a) produce product P or P(a) by use of the apparatus of the present invention in a manner to be described, punches 134 (or 134a not shown) urge the product P or P(a) out of the respective cavities and onto a conveyor belt 210. The conveyor belt 210 is driven by a conveyor drive wheel 220 which is, in turn, driven by being fixed on a common axle with a drive wheel 222. The drive wheel 222 is driven by virtue of having sprockets thereof engaging drive chain 224 which is, in turn, being driven by being in engagement with sprockets of a main drive wheel 226. The main drive wheel 226 is powered by a drive motor 228 through a gearing arrangement within the housing 230, which gearing arrangement is not shown but is of conventional manufacture.

As the plate 80 travels from the forming station 34 to the removing station 36 there is a possibility that the weight of the foodstuff slurry S and the release action of the gellation agent to be discussed hereinafter may operate to cause the product P to partially or completely be dislodged from the forming cavity 110 as soon as the cavity leaves the forming station and exits from between the foodstuff channeling plate 128 and the backing plate 130. This dislodgement may occur before the punches 134 have intersected the forming cavities 110 and urged the product P therefrom.

This accidental dislodgement may result in the product P being pulled from the cavity 110 if the product is only partially dislodged and contacts a conveyor belt 210 that is moving much more rapidly than the speed at which the plate 80 is advancing from the forming station 34 to the removing station 36. A result would be wasteful breakage of the product P. Alternately, if the conveyor belt 210 were moving too slowly with respect to the speed of advance of the plate 80 as aforesaid, the product P may tend to be bent under and retarded by the conveyor belt 210 again causing wasteful breakage of the product.

In order to prevent this unwanted and needless breakage, the speed of operation of the motor 228 (and, in consequence of the power train connection heretofore described, the speed of advance of the conveyor in a clockwise direction as viewed in FIGS. 1, 4 or 5) is controlled to match the speed of advance of the forming plate 80 from the forming station 34 to the removing station 36. This may be accomplished by the use of a silicon controlled rectifier or other controller contained within housing 240 (see FIG. 1) for controlling the amount of power supplied to the motor 228 or by some other available form of variable gearing to permit variation of the speed of rotation of the conveyor belt 210.

The control system which is used in the preferred embodiment of the present invention is virtually completely pneumatic and utilizes a plurality of normally closed pneumatically operated limit switches (which are actually valves and act as such) and requires a supply of cleaned refrigerated air under pressure. It is to be understood, however, that an electrical control system can be substituted for the pneumatic control system to be described and can function in substantially the same manner to control the operation of the forming machine 20. Throughout the description of the operation and the functioning of the control system, previously used reference numerals will be used to designate elements previously described.

A supply of refrigerated, dried air is provided from a source to a main line which, in the preferred embodiment, supplies the air at a pressure of 100 pounds per square inch and which is capable of supplying air at that pressure at the rate of 100 cubic feet per minute.

The source of air is connected to one side of a conduit 242 (see FIG. 11) the other side of which is connected to the inlet of a normally closed limit switch 132a. The limit switch 132a has its outlet connected through conduit 244 to the inlet of limit switch 132b thereby effectively placing the two limit switches 132a, 132b in series with each other for actuation by the leftmost end of the forming plate 80 when it is in the position illustrated in FIG. 4 with the piston rods 116, 118 of the actuating cylinders 112, 114 extended.

The outlet of the limit switch 132b is connected by conduit 246 to the inlet side of a main on-off switch 248. The outlet of the main on-off switch is connected by conduit 250 to the pilot 252 of a control valve 254, the general operation of which will be discussed.

The control valve 254 is connected to a supply of air through an inlet conduit 256 and generally includes a main valve body 258 which functions to channel the air received through the conduit 256 to one of the two outlet conduits 260, 262. Which of the conduits 260, 262 are to receive air through the valve body 258 is determined by the valve pilot 252 which received air alternately through the conduits 250, 264.

If air enters the pilot 252 through the conduit 250, air entering the control valve 254 through the conduit 256 is directed by actuation of the pilot through conduit 262. If, on the other hand, the pilot 252 receives air through the conduit 264, the pilot causes the valve body 258 to direct the entering air through the outlet in communication with conduit 260.

If the control valve 254 directs air through the conduit 262, it supplies air to the lefthand portion of the piston within the cylinders 112, 114, and forces retraction of the piston rods 116, 118. Retraction of the piston rods, 116, 118 causes the transportation of the plate 80 attached thereto from the forming station 34 toward the removing station 36.

In a like manner, if the piston rods 116, 118 are in a retracted position and air is supplied to the pilot 252 through conduit 264, air coming into the control valve 254 through the conduit 256 exits from the valve through the conduit 260 which is connected to supply air to the righthand part of the double acting cylinders 112, 114 and the piston rods 116, 118 are extended, thereby transporting the plate 80 from the removing station 36 to the forming station 34.

In a similar manner, a supply of air is connected by a conduit 266 to the inlet of limit switch 136b located on the right of the machine as seen in FIGS. 4 and 5, the outlet of which is connected by conduit 268 to the inlet of the limit switch 136a, thereby effectively placing the two limit switches 136a, 136b in series. The outlet of the limit switch 136a is connected by conduit 270 to a "one-shot" valve 272 which permits the passage therethrough of a single "shot" or pulse of air. The valve 272 does not permit passage therethrough of any additional air until it resets itself which only occurs when the air pressure in the conduit is relieved. The outlet of valve 272 is connected by a conduit 274 to the pilot 276 of a control valve 277. The other end of the pilot 276 of the control valve 277 is connected by conduit 280 to the outlet of limit switch 150 (see FIGS. 4, 5 and 11), the inlet of which is connected to a supply of air through conduit 282.

Valve 277 receives air from a supply through conduit 284 and, if conduit 274 has supplied air to the pilot 276, the valve body 278 supplies the air from the conduit 284 through conduit 286 to urge the double acting punch actuating cylinder 162 and the associated punch mechanism downwardly.

Alternatively, if the pilot 276 receives air through the conduit 280, the air supplied to the valve 277 through the conduit 284 is directed through the conduit 288 to the cylinder 162 to urge the double acting piston and associated punch mechanism upwardly.

The limit switch 154 (see FIGS. 4, 5 and 11) receives air at its inlet through conduit 290 and, upon actuation of the limit switch by the cam 148, supplies air through a conduit 292 to a "one-shot" valve 294. If the valve 294 has been reset, it supplies a pulse of air to the pilot 252 of valve 254 through the conduit 264.

If the pilot 252 receives air through the conduit 264, the valve body 258 directs the air it has received through conduit 256 through conduit 260 to supply air to the right of the double acting cylinders of the pistons 112, 114 to extend the piston rods 116, 118, thereby transporting the forming cavities 110 or 110(a) within the forming plate 80 or 80(a) from the removing station 36 to the forming station 34.

The limit switch 152(see FIGS. 4, 5 and 11) receives air at its inlet from a supply through conduit 296 and, upon actuation by the cam 148, sends air through a conduit 298 to the inlet of "one-shot" valve 300. If valve 300 has been reset by a previous release of air pressure in conduit 298, it sends a pulse of air through conduit 302 to a valve 304.

Figure 11:
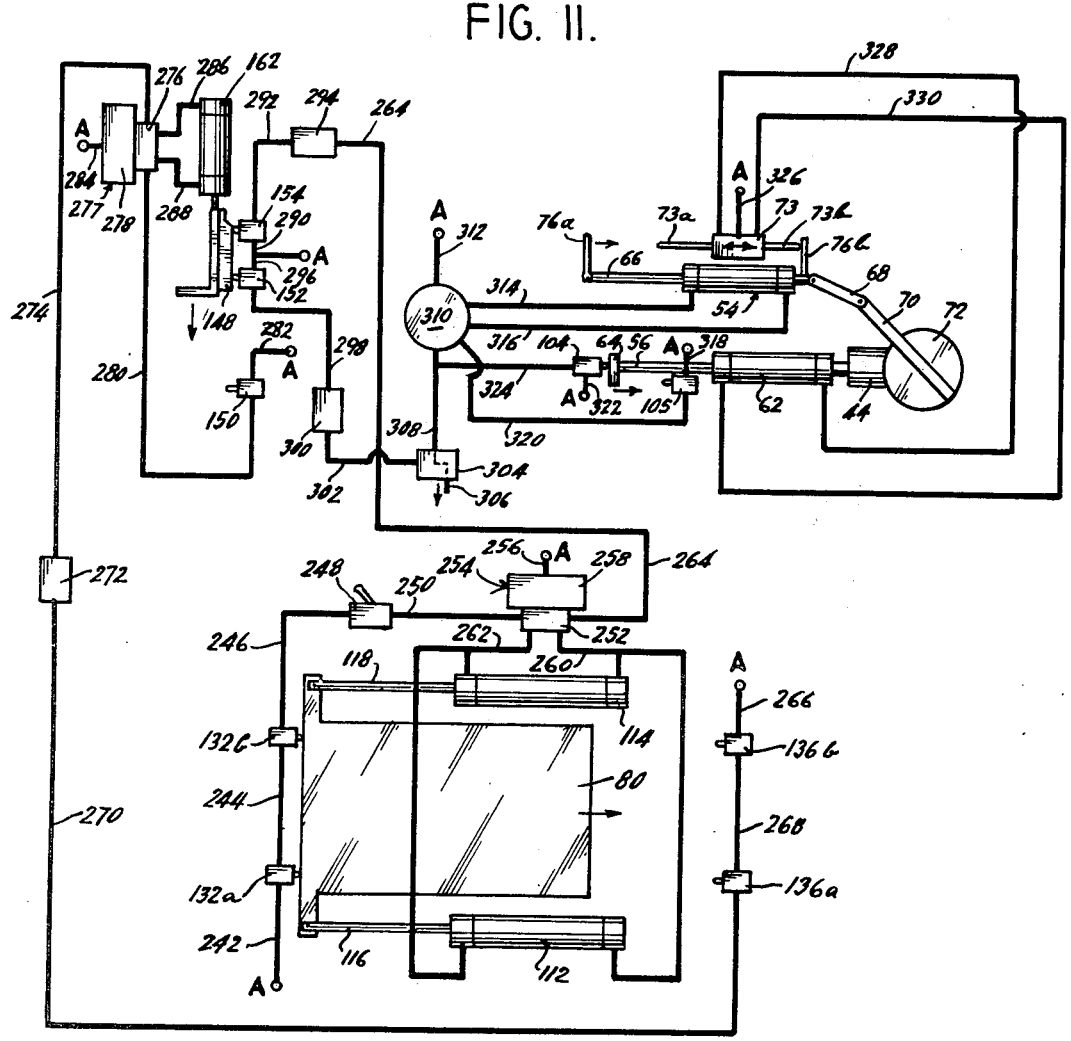

The valve 304 is a spring loaded valve, the operation of which will be described in detail hereinafter, and includes an outlet conduit 306 and an inlet conduit 308. A valve 310 is connected at an inlet thereof to a source of supply of air through a conduit 312. An outlet from the valve 310 is connected by conduit 314 to the left side of double acting drum valve actuating cylinder 54. The piston rod 66 of the cylinder 54 is moved to the right upon the valve 310 directing air through the conduit 314. Another outlet from the valve 310 is connected by conduit 316 to the right of the double acting drum valve actuating cylinder 54 to move the piston rod 66 and associated mechanism to the left as seen in FIGS. 1 and 11 upon supply of air to the cylinder 54 through the conduit 316.

The limit switch 105 (see FIGS. 2 and 11) has an inlet thereof in communication with a supply of pressurized air through a conduit 318. An outlet port of the valve 105 is connected to an inlet of the valve 310 by a conduit 320.

The limit switch 104 (see FIGS. 2 and 11) receives a supply of pressurized air from a supply through conduit 322 at an inlet thereof. Upon actuation of the limit switch 104 by the actuator 64, air is supplied through conduit 324 from an outlet of limit switch 104 to conduit 308.

Spool valve 73 receives a supply of pressurized air from a supply through conduit 326 and, depending upon the position of operators 73a, 73b, supplies the received air to either one or the other of conduits 328 and 330 connected thereto.

Conduit 328 connects an outlet of the spool valve 73 which the right of double acting actuating cylinder 62 for use in urging the piston 60 and the attached piston rod 56 to the left (see FIGS. 1, 2, 3 and 11) when air is supplied thereto through conduit 328.

Conduit 330 is connected to an outlet of valve 73 and to the left side of double acting actuating cylinder 62 to move the piston 60 and the attached piston rod 56 thereof to the right (see FIGS. 1, 2, 3 and 11) when air is supplied thereto through conduit 330.

In operation, the following components are in the following "normal" positions: the foodstuff advance piston 58 and the mechanism associated therewith is in the leftmost position as illustrated in FIG. 2 with a predetermined supply or "charge" of foodstuff slurry S therein (the foodstuff slurry S contains a gel-forming material such as sodium alginate in combination with finely divided food particles of, for example, fish, shrimp or chicken); the drum valve body 72 is in the position illustrated in FIG. 2, in communication with the interior of the hopper 38; the double acting actuating cylinders 112, 114 are in position with the piston rods 116, 118 thereof in the extended position and the plate 80 is in a position so that the forming cavities 110 are at the forming station 34 in registry with the cavity supply openings 126; the double acting punch-actuating cylinder 162 is in the retracted position as shown in FIG. 4; and, the weirs 166, 172 include a bath B of a suitable gel-forming, lubricating, release solution containing alkaline earth irons, for example, calcium chloride, up to their respective spill-over walls 170, 176. In addition, a suitable amount of foodstuff slurry S is contained in the hopper 38 and in the conduit 108, the cavity 124 and the openings 126.

Upon actuation of the switch 248 from the "off" position to the "on" position, if the plate 80 is in the normal, leftmost position as shown in, for example, FIG. 4, the series arranged limit switches 132a, 132b, are both actuated by the leftmost edge of the forming plate 80 and air, supplied through conduit 242, passes through limit switch 132a, through the conduit 244, through the limit switch 132b, through the conduit 246, through the switch 248 and the conduit 250 and enters the pilot 252 of the valve 254.

Air entering the pilot 252 of the valve 254 through the conduit 250 causes air entering the valve 254 through conduit 256 to be directed by the valve body 258 through conduit 262 which divides to supply air to the left side of both cylinders 112, 114 to impinge upon the pistons therein and retract the rods 116, 118. Retraction of the rods 116, 118 moves the plate 80 with the forming cavities 110 therein to the right transporting the cavities from the forming station 34 toward the removing station 36.

When the rightmost edge of the forming plate 80 has advanced to the right to a position wherein the rightmost edge thereof actuates both limit switches 136a and 136b, air under pressure which has entered the limit switch 136b through the conduit 266 can pass therethrough, through the conduit 268 into and through the actuated limit switch 136b and out along conduit 270 which supplies it to the inlet of valve 272.

If valve 272 has been previously reset, it supplies a pulse of air directed through conduit 274 to pilot 276 of valve 277. The continuation of pressure in the conduit 270 prevents an additional pulse of air from being transmitted through valve 272 until actuation of limit switches 136a and 136b ceases and they vent conduit 270 and valve 272 re-sets itself. This will not occur until the plate 80 moves to the left.

When the pulse of air enters pilot 276 of valve 277 through conduit 274, it causes valve 277 to introduce air received therein through conduit 284 into conduit 286 which is directed to the top of punch actuating cylinder 162, forcing the piston and piston rod 160 thereof (see FIG. 5) downwardly along with the punch bracket 140 and the punches 134 affixed thereto. It should be noted that the limit switches 136a, 136b are located horizontally relative to the forming plate 80 that they are not actuated and the punch actuating cylinder 162 is not actuated as described above until the cavities 110 are aligned with the respective punches 134.

As may be noted from reference to FIGS. 4 and 11, when the piston rod 160 is in the retracted or "normal" position, the cam 148 bears against and actuates both limit switches 152 and 154 and when the piston rod 160 is in the extended position as shown in FIG. 5, neither of the limit switches 152 or 154 are actuated thereby. Rather, when the piston rod, and the punches 134 operatively connected thereto, is in the fully extended position as shown in FIG. 5, the cam 148 actuates the limit switch 150.

When the limit switch 150 is actuated, air is supplied to the inlet thereof through conduit 282 and, as a result of the switch 150 being actuated, the air passes therethrough and is directed through conduit 280 to the pilot 276 of the valve 277. When the pilot 276 receives air through conduit 280, it directs air from the conduit 284 through the conduit 288 which initiates operation of the punch actuating cylinder 162 in the upward direction carrying the piston rod 160 (see FIG. 4) and the punches 134 operatively connected thereto from the extended position shown in FIG. 5 wherein the punches 134 extend through and intersect the cavities 110 back to the "normal" position where said intersection does not take place.

As the cam 148 moves upwardly and out of contact with the actuating switch 150, the normally closed actuating switch 150 closes and pressurized air is no longer directed into conduit 280 which is permitted to vent through switch 150. However, due to the actuation of the pilot 276, valve 277 continues to supply air from the conduit 284 through the conduit 288 to the bottom of actuating cylinder 162.

As the piston rod 160 returns to its "normal" position, the actuating cam 148 first actuates limit switch 152 and then, in turn, actuates limit switch 154. Limit switches 152 and 154 remain actuated by the cam 148 as long as the actuating cylinder 162 retains the piston rod 160 in the "normal" position.

When limit switch 152 is actuated, air which is supplied thereto through the conduit 296 (see FIG. 11), passes therethrough and is supplied to the conduit 298. The "one-shot" or "pulse" valve 300 supplies a pulse of air through the conduit 302 to the valve 304. When valve 304 receives the pulse of air from the conduit 302, it momentarily moves a spring-loaded valve body contained therein off of a seat and permits air to momentarily escape from a pilot of valve 310 to atmosphere through outlet 306.

The escape of air from the pilot of valve 310 causes the valve 310 to supply air received through conduit 312 along conduit 316 to the right side of double acting drum valve actuating cylinder 54 forcing the piston rod 66 to the left, thereby establishing communication between the interior of the foodstuff supply cylinder 44 and the conduit 108 through the left arm 96 and the right arm 98 of the valve body 72 which has been rotated by virtue of the connection of the actuating arm 70 through the connecting arm 68 to the piston rod 66 (see FIGS. 1, 3 and 11).

When the actuating cylinder 54 has extended the piston rod 66 as far to the left as its stroke will permit, the actuator 76b on the right end thereof contacts the operator rod 73b of the valve 73 moving the operator rod 73b to the left. This forces the internal spool within the spool valve 73 and the left operator rod 73a to the left. Air from a supply is then directed from the conduit 326, by the spool valve 73 along the conduit 330 to the left side of actuator cylinder 62 which thereby impinges upon the piston 60 therein. This forces the piston 60 and the piston rod 56 and associated mechanism to the right in the direction of the directional arrow C (see FIG. 3). This movement forces the foodstuff advance piston 58 to advance the predetermined amount of foodstuff slurry S contained within the cylinder 44 through the conduit 108 toward the forming station 34.

Once the piston rod 56 has advanced to the right and the actuator 64 abuts and actuates limit switch 105 (see FIGS. 2 and 11), air enters limit switch 105 through conduit 318, passes through the limit switch, and is directed along conduit 320 to valve 310. Upon receipt of air from conduit 320, the valve 310 switches the air entering through conduit 312 from conduit 316 to the conduit 214 thereby forcing the piston within cylinder 54 and attached piston rod 66 to the right thereby rotating drum valve body 72 to the right through the associated linkage described hereinbefore and establishing communication between the interior of hopper 38 and the interior of the foodstuff supply cylinder 44 through the left arm 96 and the bottom leg 94 of the passageway within the valve body 72 (see FIGS. 2 and 11).

When the piston rod 66 has moved all the way to the right, the actuator 76a abuts against and operates the operating rod 73a to the right, which causes the spool within spool valve 73 to shift to the right (and also shifts operator 73b to the right) causing air entering the spool valve 73 through the conduit 326 to be shifted from conduit 330 to conduit 328.

Air entering conduit 328 is directed to the right of actuating cylinder 62, impinges upon piston 60 therein and moves the piston and the associated piston rod 56 and the actuator 64 on the end thereof to the left.

When the piston rod 56 moves to the left sufficiently to cause the actuator 64 to actuate the limit switch 104, air enters the limit switch 104 through conduit 322, passes through the limit switch 104 and is directed along conduit 324 to valve 310 where it re-pressurizes the pilot of valve 310.

When piston rod 56 moves to the left under pressure of the air supplied to the right side of cylinder 62 through the conduit 328, the piston 58 draws an amount of foodstuff slurry S into the interior of the cylinder 44 from the supply hopper 38. The amount of foodstuff slurry S drawn in is controlled by controlling the length of the stroke of the cylinder 62.

As may be noted by reference to FIG. 2, "strongback" stop 102 is adjustably mounted on extension arm 52 in order that the limit of travel of the stroke of piston rod 56 to the left may be controlled. In this manner the amount of foodstuff slurry S to be injected during each actuation of the cylinder 62 may be predetermined. The amount of foodstuff slurry S to be injected depends on various factors including the degree of compressibility of the material, the size of the forming cavities, the leakage factor, and numerous other variables.

As noted above, when actuator 64 actuated the limit switch 104, the pressure in the conduit 324 reset the pilot in the valve 310. Valve 310 is therefore in a condition to release the pressure on the pilot through valve 304 upon receipt by valve 304 of a pulse of air through valve 300 along conduit 302. Receipt of such a pulse would again initiate the above-described supply sequence. Valve 152 continuously supplies air to "oneshot" valve 300 which will not permit another pulse to pass therethrough until it is reset. Valve 300 cannot be reset until the pressure thereon is released by the downward movement of the piston rod 160 and cam 148 associated therewith. When that occurs, conduit 298 vents through switch 152 being reactuated once the piston rod 160 and cam 148 again move upwardly.

As noted above, when the piston rod 160 moves upwardly cam 148 first contacts and actuates the limit switch 152. The cam 148 next contacts and actuates the limit switch 154. When the limit switch 154 is actuated, air from a supply is directed to the inlet of switch 154 through the conduit 290, passes through the switch 154 along the conduit 292 to the "one-shot" valve 294. Valve 294 supplies a pulse of air along conduit 264 which directs the air to the pilot 252 of valve 254.

Receipt of air by the pilot 252 of the valve 254 causes air from conduit 256 supplied to the valve body 258 to be switched from conduit 262 to conduit 260. Conduit 260 divides to supply air to the right side of the cylinders 112, 114 which operate to move the piston rods 116, 118 and the plate 80 attached thereto to the left. The forming cavities 110 are thereby transported from the removing station 36 toward the forming station 34.

It should be noted that the transportation of the forming plate 80 with the cavities 110 being directed from the removing station 36 to the forming station 34 could not have been initiated until the punches 134 were removed from intersection with the cavities as the actuation of the cylinders 112, 114 could not be initiated until the cam 148 attached to the punch bracket 140 actuated the limit switch 154. This actuation could not occur until the punches 134 were removed from the cavities 110.

As noted above, when the cam 148 actuated the limit switch 152, through the sequence described above, cylinder 62 received air through conduit 330 which caused the piston 60 to be moved to the right, thereby causing piston 58 within the cylinder 44 to move the foodstuff slurry S along the conduit 108.

As the foodstuff slurry S moved along the conduit 108, it was forced therethrough until it entered the foodstuff distribution plate 120 through the opening 122 therein and entered the manifold cavity 124.

When sufficient operations of the forming machine 20 have occurred, sufficient foodstuff slurry S would have been transported to completely fill the manifold cavity 124 and the cavity supply openings 126 in the foodstuff channeling plate 128.

The manifold cavity 124 which is in communication with all of the openings 126 ensures uniform distribution of foodstuff slurry to each of the openings 126 preparatory to passage of the slurry therethrough into the forming cavities 110.

As the forming plate 80 moves to the left toward the forming station 34, the process has been initiated by cam 148 actuating switch 152 to begin supply of the predetermined amount of foodstuff slurry S. As the forming cavities 110 come into communication with the supply openings 126 the foodstuff slurry S begins to be forced into the cavities to begin formation of the product P. The formation process is completed when the forming plate 80 moves all the way to the left and the cavities 110 are completely within the forming station 34.

As noted hereinbefore, a constant supply of a combination gellation-release agent is provided the weirs 166, 172 through the conduit 202 and "T" 204 in an amount sufficient to cause a continuous bath or sheet of gellation agent to be spilled over the edges 170, 176 on either side of the limits of the forming station 34. When the forming plate 80 is in the position shown in FIG. 5, the continuous bath of gellation agent from the weir 172 flows out onto the forming plate 80 and travels along the entire transverse width thereof. As the plate 80 moves to the left after the cylinder 162 has retracted the punches 134 from the cavities 110, the entire surface thereof including the empty forming cavities 110 passes under the falling bath of gellation agent from the weir 172.

A sufficient amount of gellation agent remains on the top surface of the forming plate 80 to be wiped off by the rightmost edge of the foodstuff channeling plate 128 as the plate 80 moves to the left to cascade down the edge of the cavities 110. Some of this gellation agent forms a pool or collection under the forming cavity on the backing plate 130 once the forming cavities 110 are completely within the forming station 34 beneath the foodstuff channeling plate 128.

Consequently, the foodstuff slurry S which is delivered to the forming cavities 110 will contact the gellation agent as soon as the foodstuff slurry S is forced into the cavities 110 therby gelling the gel-forming material on the surface of the formed foodstuff.

Once the forming plate 80 is moved to the right toward the removing station 36, it again passes under the bath of cascading gellation material from the weir 172, thereby gelling the gel-forming material on the top surface of the foodstuff slurry S and the entire product P is gelled prior to the punches 134 urging the formed product P from the forming cavities 110.

In addition to performing the function of gelling the gel-forming material in the foodstuff slurry S, the gellation agent also acts as a release agent permitting easy removal of the formed product P from the cavity 110. Further, the gellation agent facilitates the sliding action of the plate 80 between the foodstuff channeling plate 128 and the backing plate 130.

The clearance between the foodstuff channeling plate 128 and the backing plate 130 must be sufficient to permit reciprocating transportation of the plate 80 between the forming station 34 and the removing station 36 but cannot be so great as to permit unwanted extrusion of slurry S between the bottom surface of the foodstuff channeling plate 128 and the top surface of the forming plate 80.

In order to aid in containing the foodstuff slurry S within the forming station 34, the weir 166 continuously supplies a curtain of gellation agent to the top surface of the forming plate 80 on the left side thereof. By virtue of the reciprocation of the plate 80, the supplied gellation agent forms a bead at the juncture of the left edge of the foodstuff distribution plate 128 and the adjacent top exposed surface of the forming plate 80.

In a like manner, there is a similar bead of gellation agent formed at the juncture of the right edge of the foodstuff channeling plate 128 and the adjacent top surface of the plate 80.

The existence of these two beads serves to lubricate the reciprocation of the forming plate 80 and, perhaps more importantly, aids in containing the foodstuff slurry S within the forming station 34 as defined by the left and right edges of the foodstuff channeling plate 128.

Provision of the manifold cavity 124 within the foodstuff distribution plate 120 in communication with all of the supply openings 126 in the foodstuff channeling plate 128 permits uniform distribution of foodstuff slurry S to each of the forming cavities 110 when they are in registration with the cavities 126. This structure eliminates the need for separate conduits 108 in communication with each of the individual cavities 110.

Further, the provision of a foodstuff channeling plate 128 and the openings 126 therein in communication with the reciprocated forming plate 80 substantially reduces the number of square inches of exposed foodstuff which is available to the reciprocating forming plate 80. This minimizes leakage of the foodstuff slurry S from without the confines of the forming station 34.

Minimization of leakage is from the forming station 34 especially enhanced by the use of the continuous curtain of gellation agent supplied at both the left and right side of the forming station 34 by weirs 166, 172 forming the beads at the left and right edges of the slurry channeling plate 128.

Since the apparatus of the present invention is particularly adapted for use with a foodstuff slurry and since it is desired to maximize containment of the slurry within the confines of the forming station, the provision in the present apparatus of a predetermined amount of slurry is particularly advantageous.

As noted hereinabove, the location of the stop plate 102 on the arm 52 can be varied with respect to the location of the actuating cylinder 62. Consequently, in the manner described above, the actuating member 64 at the left end of the piston rod 56 can be stopped a variable distance from the cylinder 62 which varies the length of the stroke of the piston 58 as well. This, in turn, varies the amount of foodstuff slurry S which will be drawn into the cylinder 44 during the intake stroke of the piston 58. This varies the amount of foodstuff slurry S delivered to the cavities 110 when they are in communication with the interior of the cylinder 44.

As the configuration of the cavities is varied for different products and as the alternate, wedge-shaped forming plates are utilized, the predetermined amount of slurry provided can be varied to provide the proper amount of slurry for the particular cavity being used.

In addition, as slurries of different materials having different characteristics are used, the predetermined amount of slurry provided can be varied as well.

Further, the length of the stroke of the cylinder 62 can be varied to vary the pressure supplied to the foodstuff slurry S if the same is necessary to ensure complete filling of the forming cavities by adjusting the stroke of the cylinder to be slightly greater than the capacity of the cavities, thereby increasing the pressure on the foodstuff to be extruded.

As noted above, it is known in the art to supply an extrudable foodstuff to a forming cavity and force the same to assume the configuration of the cavity thereafter ejecting the configured, formed foodstuff therefrom.

It is also known in the art to coat the exterior of an exposed extruded foodstuff containing a gel-forming material with a gellation agent to gel the gel-forming material on the exterior of the formed shape to envelop the formed product with a gelled skin.

However, until the apparatus of the present invention, it was not known to supply a predetermined amount of a foodstuff slurry containing a gel-forming material to a forming cavity and coat the formed product with a gellation agent with as uncomplicated an apparatus as the weirs 166, 172 of the present invention.

Further, it was not known to coat the entire surface of a formed food product, including the underside of the surface which contacts an interior part of the forming apparatus (the backing plate 130) during introduction of the slurry S into the forming cavity during the formation process.

The lack of method of apparatus for wetting the surface of a formed foodstuff containing a gel-forming material with a gellation agent within the forming apparatus without the use of complicated and expensive equipment has precluded development of a commercially acceptable machine until the present invention.

The present invention provides a simple, inexpensive and economical device and method for forming a plurality of formed food products from a foodstuff slurry containing a gel-forming material while bathing substantially all of the food product with a gellation agent while it is still within the forming station environment and bathing the remainder of the product with gellation agent immediately upon its exiting from the forming station by use of an extremely simple and uncomplicated apparatus.

In addition, the apparatus of the present invention provides positive control means for ensuring that the product which is formed is uniform and complete and that the apparatus of the present invention does not malfunction by the provision of various safeguards for preventing initiation of certain operations until other operations are completed.

The formed product P which is carried away from the forming machine 20 by the conveyor 210 may be further processed, such as by being battered and breaded and fried prior to being frozen or by being battered and breaded and frozen prior to being fried. During the frying process, the water within the product turns to steam and the product P or P(a) seen in FIGS. 7 and 10 tends to puff up and smooth out the sharp corners in the product illustrated in FIGS. 7 and 9.

Naturally, the apparatus and method of the present invention renders possible the formation of shapes other than the generally uniform cross-section fish shape shown in FIG. 7 and the generally wedge-shaped cross-section chicken leg shape shown in FIG. 9. Other possible shapes include fan-tail shrimp shapes, egg roll shapes and others.

In addition, other, non-uniform cross-section products may be produced, such as, for example, crinkle-cut shapes, by the use of appropriately shaped forming plates and foodstuff channeling plates with either plane or appropriately configured backing plates.

The provision of the reciprocating forming plate of longitudinally constant cross-section and transversely varying cross-section (the terms longitudinal and transverse being relative to the direction of movement of the plate 80(a)) to produce the simulated chicken leg piece of FIG. 9 is illustrative and not restrictive.

As will be readily apparent to those skilled in the art, the invention may be used in other specific forms for other formed products without departing from its spirit or essential characteristics. The present embodiments are, therefore, to be considered as illustrative and not restrictive, the scope of the invention being indicated by the claims rather than by the foregoing description, and all changes which come within the meaning and range of equivalence of the claims are therefore intended to be embraced therein.

What is claimed is:

1. A method of forming a shaped comestible, from a slurry of a gellable solid foodstuff containing a gel-forming material, comprising the steps of providing a supply of said slurry containing said gel-forming material, providing at least one forming cavity in a forming plate of a predetermined configuration defining a predetermined volumetric space within the forming plate, providing a forming station which includes a backing plate which has one surface bounding one side of said forming plate so as to close one side of said cavity when said cavity and forming plate are located at said forming station, metering an amount of said slurry substantially equal in volumetric amount to said predetermined volumetric space within said forming plate, wetting the perimeter of said forming cavity and wetting the bounding surface of said backing plate at the cavity with an agent which functions as a gellation agent and as a release agent, then supplying said metered predetermined volumetric amount of said slurry to said forming cavity when said cavity is located at said forming station so as to form said slurry into the configuration of said forming cavity and to thereby coat with said agent the periphery and one side of said slurry supplied to said cavity, thereafter coating the remaining side of said slurry with said agent; thereby coating the entire surface of slurry supplied to said forming cavity with said agent and thereby gelling the entire surface of said slurry and forming a product, transporting said filled forming cavity including said formed product to a removing station, and removing said formed product from said forming cavity at said removing station.

2. The invention according to claim 1 wherein wetting the perimeter of said forming cavity with said agent includes continuously supplying a predetermined amount of said agent to the upper surface of said forming plate, and wherein removing said formed product from said forming cavity includes aligning said forming cavity in registry with a punch at said removing station and operating said punch to intersect said forming plate and extend through said forming cavity thereby urging said formed product therefrom.

3. The invention according to claim 1 including maintaining said slurry, which is at said forming station and not within said forming cavity, within said forming station by providing an upper plate and said backing plate each being in sliding contact with said forming plate on opposite sides thereof and each have transversely extending opposite ends being vertically aligned relative to one another and extending substantially completely across said forming plate in a direction transverse to the direction of transportation of said forming plate between said forming station and said removing station, and supplying a sufficient amount of said agent to the juncture of sliding contact between said transversely extending ends of said upper plate and said forming plate to continuously provide a bead of said agent at said juncture.

4. The invention according to claim 1 including transporting said forming cavity including said formed product therein to said removing station in a given direction at a given speed, providing a conveyor having a surface thereof in registry with said forming cavity at said removing station for transporting said removed formed product, and moving said conveyor surface in said given direction at a speed substantially equal to said given speed.

5. The invention according to claim 1 wherein gelling the entire surface of said slurry includes providing a sufficient amount of said agent to the surface of said forming plate whereby movement of said forming plate between said forming station and said removing station causes said agent to wet the surface of said slurry contiguous said forming plate.

* * * * *